Aug. 11, 1959   L. O. CARLSEN ET AL   2,898,780
INDEX MECHANISM FOR A GEAR MACHINE OR THE LIKE
Filed July 2, 1956   3 Sheets-Sheet 1
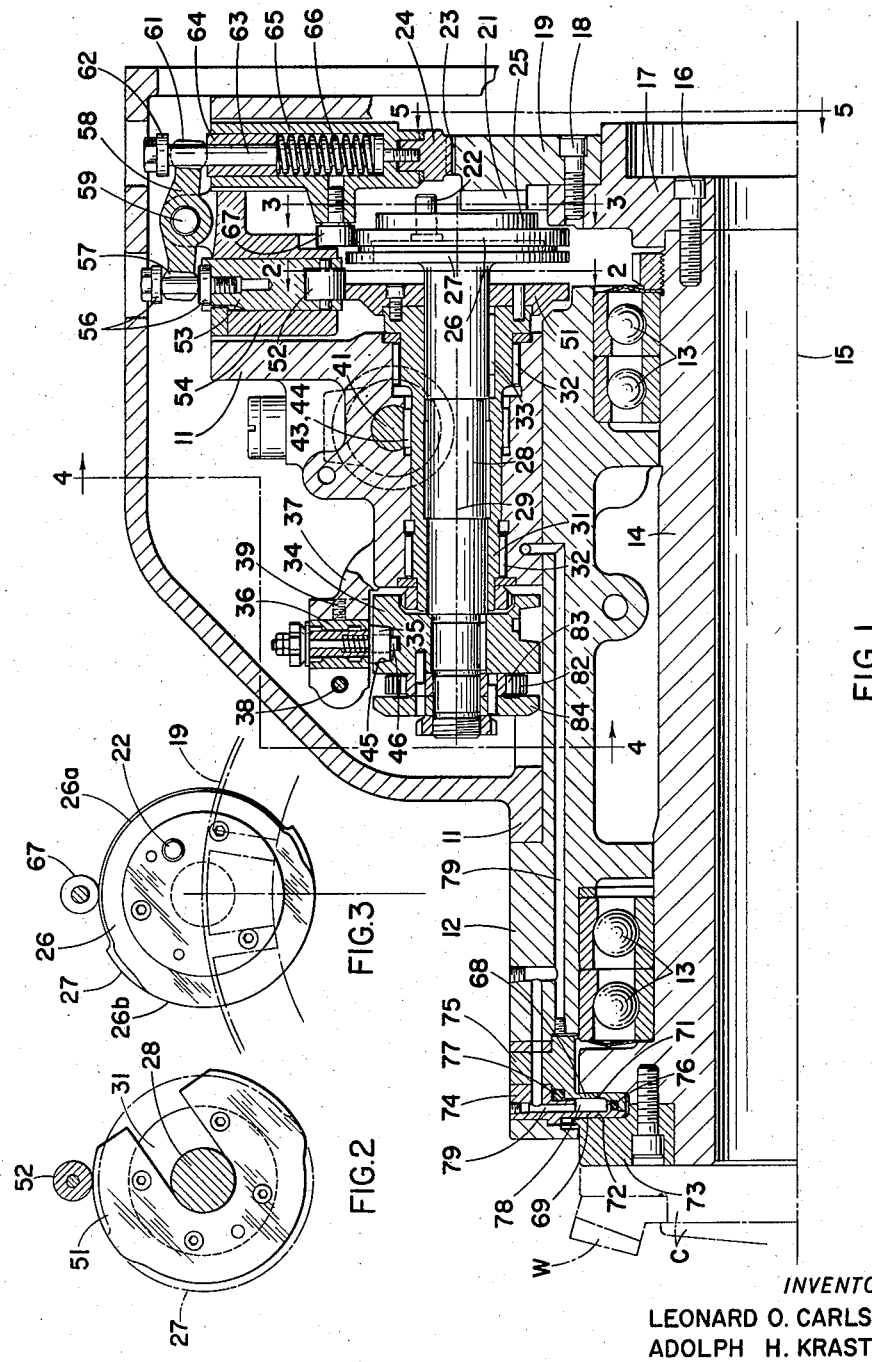
INVENTORS
LEONARD O. CARLSEN
ADOLPH H. KRASTEL
BY Richard W. Treverton
ATTORNEY

United States Patent Office 2,898,780
Patented Aug. 11, 1959

2,898,780

INDEX MECHANISM FOR A GEAR MACHINE OR THE LIKE

Leonard O. Carlsen, Rochester, and Adolph H. Krastel, Irondequoit, N.Y., assignors to The Gleason Works, Rochester, N.Y., a corporation of New York Application July 2, 1956, Serial No. 595,254

22 Claims. (Cl. 74—816)

The present invention relates to a gear cutting machine or other machine having like indexing requirements. More specifically it relates to such a machine having an improved index mechanism which, insofar as concerns completion of every indexing cycle and accuracy of indexing, is insensitive to small variations in the magnitude of the motion transmitted to it by its drive system. Accordingly the invention makes feasible the employment of a flexible index drive system which will readily accommodate the necessary adjustments and motions between the several major components of the machine. For example the preferred embodiment of the invention employs a hydraulic drive which has flexible conduits extending between relatively movable parts of the machine.

A machine comprising a frame, drive and driven members mounted on the frame respectively for angular oscillation and rotation about parallel axes and also for relative axial motion, the driven member having a plurality of open ended radial slots and the drive member having a pin adapted to enter said slots successively, the pin entering and departing through the open end of each slot and its path being substantially tangent to the slot at the moments of entry and departure, means for oscillating the drive member, and means for effecting the relative axial motion in such timed relationship to the oscillation that during one oscillation the pin may enter a slot and advance the driven member and then return free of the driven member. The means for oscillating the drive member may comprise a fluid actuated reciprocatory element and a drive connection between said element and the drive member.

Preferably the machine has said driven member thereof provided with a plurality of peripheral notches corresponding in number to said radial slots, a locking dog movable on the frame, and means for urging the dog into engagement with said notches, a cam on the drive member, and a cam follower movable with the dog and adapted to be acted upon by the cam to lift and hold the dog disengaged from said notches during advance of the driven member by the drive member, and the axial shifting, of the drive member, positioning the cam out of engageable relation with the follower during return motion of the drive member.

The foregoing and other features of the invention, and their attendant advantages, will appear from the following description of the preferred embodiment shown in the accompanying drawings, wherein:

Fig. 1 is a longitudinal sectional view, taken in the planes designated by section lines 1—1 and 1—1a of Fig. 4;

Figs. 2 and 3 are detail cross-sectional views in the planes designated 2—2 and 3—3, respectively, in Fig. 1;

Figure 4:
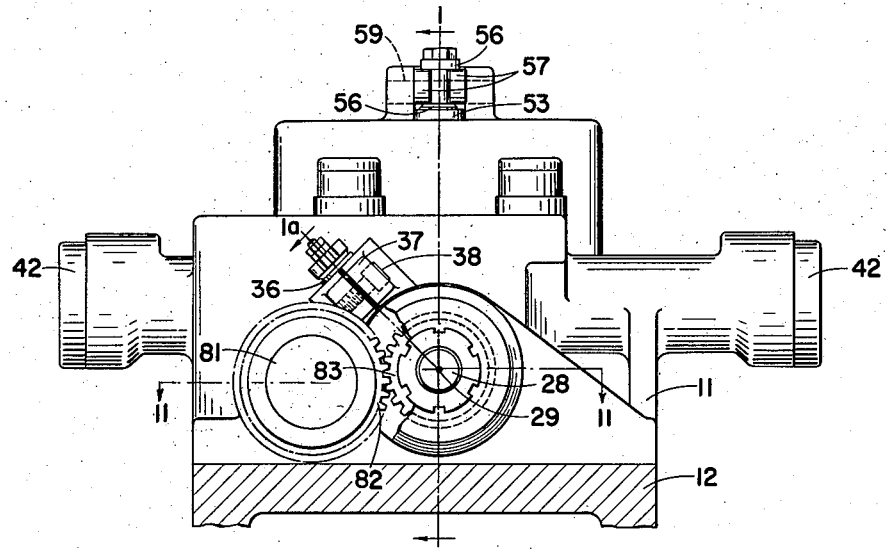
Fig. 4 is a view perpendicular to Fig. 1 approximately as seen from the planes designated 4—4 in Fig. 1.
Figures 5, 11:
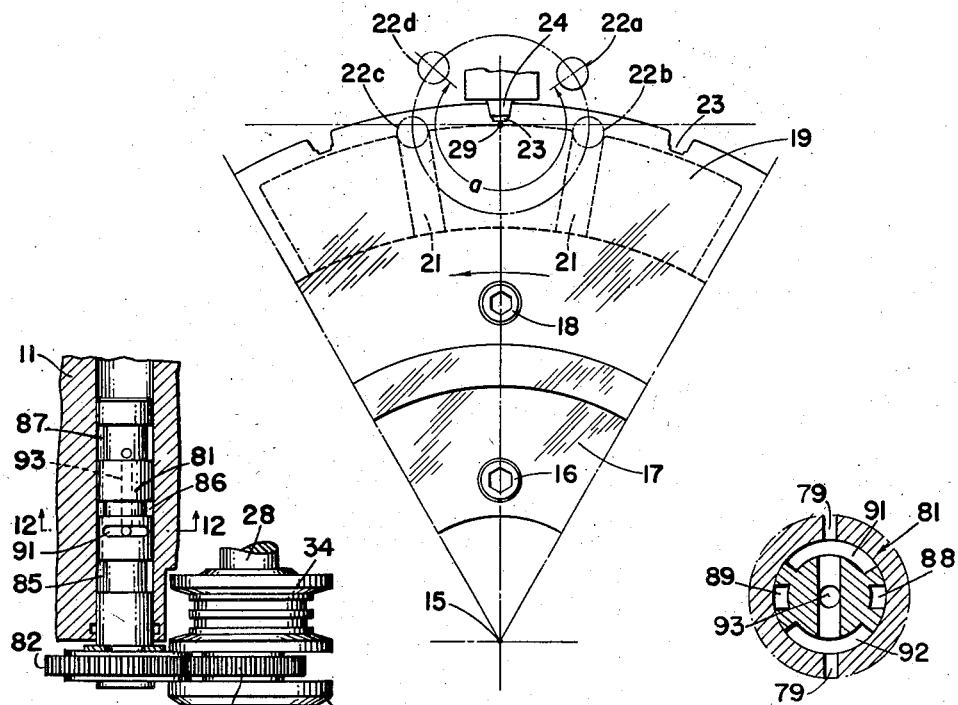
Fig. 5 is a fragmentary view in the plane 5—5 of Fig. 1.
Figure 12:
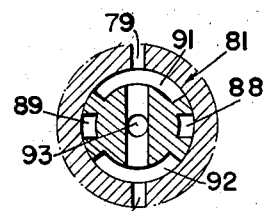
Figures 6, 7, 8:
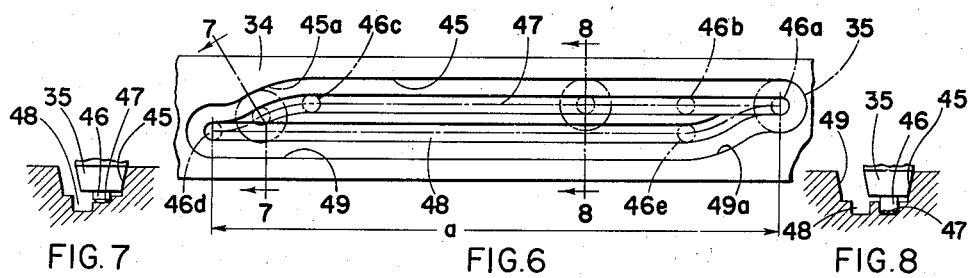
Fig. 6 is a plane development of an axial motion cam shown in Fig. 1.
Figure 9:
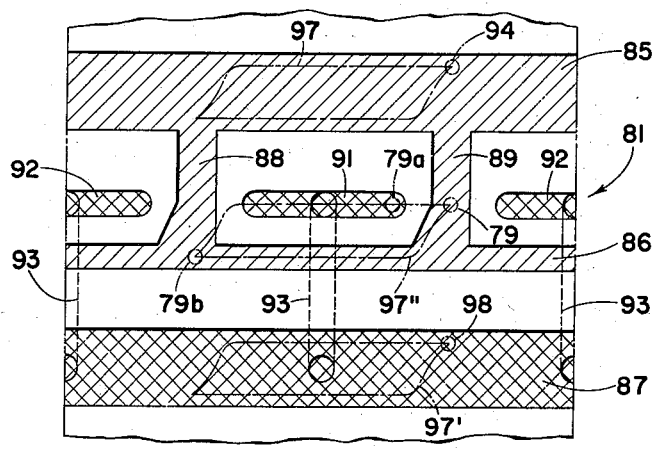
Figure 10:
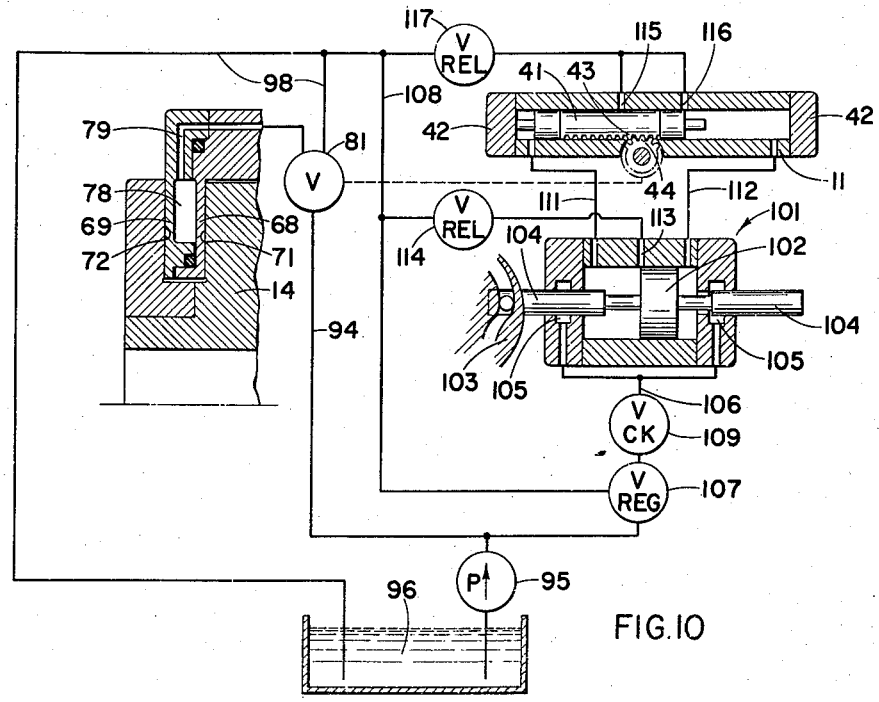

Figs. 7 and 8 are fragmentary axial sections through the axial motion cam in the planes 7—7 and 8—8, respectively, of Fig. 6;

Fig. 9 is a schematic plane development of a reciprocating and oscillating valve which is controlled in part by the axial motion cam;

Fig. 10 is a diagram of the hydraulic system for actuating the index mechanism;

Fig. 11 is a detail sectional view taken in the offset planes indicated by section line 11—11 in Fig. 4; and Fig. 12 is a detail cross-section in plane 12—12 of Fig. 11.

As shown in Fig. 1 the mechanism comprises a frame made up primarily of sections 11 and 12 and in which there is journaled for rotation on anti-friction bearings 13 a tubular work spindle 14 whose axis of rotation is designated 15. Secured to one end of the spindle by a chuck C is a workpiece W comprising a bevel gear. Secured to the opposite end of the spindle by screws 16 is a hub 17 and connected to the latter by screws 18 is a ring-shaped index plate 19. The parts 14, 17 and 19 constitute the driven member of the mechanism. The plate 19 has on its inner face a plurality of equi-spaced radial slots 21 for receiving a drive pin 22 and on its periphery a corresponding number of equi-spaced notches 23 for receiving a locking dog 24. (See also Fig. 5.)

The drive pin 22 is affixed to a member 25 which is integral with two radial-motion cams, 26 and 27, and which is secured to a shaft 28 whose axis, 29, is parallel to axis 15. Shaft 28 and pin 22 constitute the drive member of the index mechanism. The shaft is slidable axially in a sleeve 31 which is journaled by anti-friction bearings 32 for rotation in frame section 11 about the axis 29. A key 33 connects the shaft and the sleeve for rotation in unison. Secured to shaft 28 is an axial-motion cam 34 engaging a follower roller 35 that is rotatable on anti-friction bearings in a sleeve 36 mounted in arm 37 of frame section 11. The outer end of the arm is bifurcated to form a split clamp which is tightened upon the sleeve 36 by means of a screw 38. The sleeve is further held by means of a set screw 39.

The cam 34 is designed to react against the follower roller 35 to shift the index drive member 28, 22 axially at each end of a rocking motion or oscillation that is imparted to it by a piston 41. This piston is slidable in a cylinder formed in frame section 11 and closed by cylinder heads 42, Figs. 4 and 10. On the piston are rack teeth 43 meshing with pinion teeth 44 on sleeve 31. The arrangement is such that as the piston reciprocates the sleeve 31, the drive member 28, 22 is oscillated through the angle $a$, Fig. 5. During each clockwise swing (in Fig. 5) of pin 22 from terminal position 22a, the pin enters a slot 21 at position 22b and advances the index plate counterclockwise by one pitch about axis 15, leaving the slot at position 22c and continuing on to terminal position 22d. During the return swing from position 22d to position 22a the drive pin does not engage the index plate because of the retraction of the drive member 28, 22 effected by cam 34.

When the drive pin is in position 22a, Fig. 5, the stationary cam follower roller 35 engages the right end, in Fig. 6, of rear wall 45 (see also Fig. 1) of the cam slot, and a sprink-backed guide pin or detent 46, which is slidable vertically in the roller, engages in a groove 47 which extends along the bottom of the cam slot. As the pin swings clockwise to position 22b the cam, moving to the right in Fig. 6, reaches a position wherein it engages the guide pin at 46b, and when the pin reaches position 22c the cam engages the guide pin at 46c. As the motion continues, curved portion 45a of rear wall 45 engages the roller 35, and causes the drive member 22, 28 and 34 to be retracted (to the left in Fig. 1 and upwardly in Fig. 6) so that by the time the drive pin reaches position 22d and the cam engages the guide pin at 46d, the drive pin is fully retracted from the index plate. The left end of groove 47, Fig. 6, becomes progressively shallower beyond location 46c, and near 46d joins a groove 48 which extends along the bottom of the cam slot and which is of full depth at this juncture with groove 47. The grooves 47 and 48 are parallel except for their convergent terminal portions. During the return swing of the drive member in which the drive pin 22 moves from position 22d to position 22a in Fig. 5, the front wall 49 of the cam slot is kept adjacent the roller 35 by the guide pin engaging in groove 48. Between positions 46e and 46a the curved portion 49a of wall 49 engages the roller and advances the drive member to thereby bring the pin 22 into the plane of slots 21 of the index plate. The right end of the groove 48, Fig. 6, becomes progressively shallower from 46e to 46a, and shortly before the terminal position 46a is reached, the guide pin 46 drops from the shallowest part of groove 48 into the groove 47 which it then follows during the succeeding indexing motion of the drive member 22, 28, 34.

Detachably secured to the sleeve 31 is a radial-motion cam 51, Figs. 1 and 2, arranged to act on a follower roller 52 carried by a plunger 53, Fig. 1. This plunger is slidable in a member 54 that is rigid with and constitutes a part of the frame 11, 12. Secured to the plunger is a screw having spaced heads 56, and confined between these heads is a bifurcated cylindrical end portion 57 of a rocker 58 which is fulcrumed to frame member 54 by a pin 59 (see also Fig. 4). The opposite end of the rocker has a similar bifurcated portion 61 confined between head 62 of a screw 63 and the upper end of a sleeve 64. The screw also serves to secure the index plate locking dog 24 to a plunger 65 which carries the dog and slidably receives the sleeve 64. The plunger is slidable in the frame member 54 on guide means, not shown. As shown, the plungers 53 and 65 are arranged for opposed motion in directions radial of the axes 15 and 29. A coil spring 66 disposed around screw 63 acts between the sleeve 64 and plunger 65 to urge the latter downwardly. A cam follower roller 67 on the plunger 65 is engageable by the cam 26 when the drive member 22, 28, 34 is in its advanced position.

When the drive member is retracted and ready to begin its counterclockwise swing (the position wherein cam 34 engages plunger 46 at position 46d in Fig. 6), the cams 26, 27 and 51 are in the angular limit positions opposite to those shown in Figs. 2 and 3, cam 27 at this time being beneath follower roller 52 but not engaged therewith. In this position cam 27 complements cam 51 to provide a continuous circular-arc surface which engages the roller 52 as the drive member swings idly in a counterclockwise direction to move roller 22 from position 22d to 22a in Fig. 5. During the final part of this motion, while the cam 34 is acting to advance the cam 27, the cam 51 is holding roller 52 out of contact with cam 27, the final position being as shown in Fig. 2. Also the portion 26a of cam 26 is spaced from the roller 67. All during this idle or return motion of the drive member the cam 26 is out of the plane of roller 67 and the rocker 58 remains in the position shown in Fig. 1, so that the locking dog 24 is wedged into index plate notch 23 by spring 66. To assure such wedging a slight clearance is provided between screw head 62 and end portion 61 of rocker 58.

During the ensuing indexing or working swing of the drive member, in which drive pin 22 moves clockwise in Fig. 5 from postion 22a to position 22d, the lobe 26b of cam 26 raises the roller 67 to thereby lift the locking dog clear of the index plate as the drive pin 22 approaches position 22b, and then lowers the roller to allow the dog to re-engage the plate when the pin passes position 22c, the timing being such that the index plate is always controlled, either by the dog or by the drive pin 22. As the latter is moved from position 22c to position 22d and is withdrawn by action of cam 34, the clearance surface 26a of the cam 26 is again beneath roller 67 so that this roller is out of contact with the cam. The cams 26 and 51 are substantially opposite in their action, and hence the compression of spring 66 changes only slightly throughout the working swing of the drive member.

The index plate 19 is readily replaceable by other plates having different numbers of slots 21 and notches 23, to adapt the machine for workpieces of different tooth number. For the same purpose the cam 51, and the unit comprising drive pin 22 and cams 26 and 27, are so designed that they may be readily removed and replaced.

In addition to the functions previously described the drive member 22, 28, 34 serves to control a hydraulic clamp which secures the work spindle 14 directly to the frame 11, 12 except when indexing is taking place, and thereby relieves the index plate and locking dog of loads which would otherwise be placed on the work spindle incident to a gear cutting or other gear forming operation. This clamp, which is of a kind disclosed in Patent No. 2,812,186, comprises an expansible annular formation comprising relatively thin resilient side walls 68 and 69 engageable respectively with the side walls 71 and 72 of an annular groove formed in the spindle, including end ring 73 thereof. Side walls 68 and 69 are respectively integral with ring shaped sections 74 and 75 of the frame 11, 12, and at their inner ends have overlapping flanges sealed by a flexible O-ring 76. A similar seal 77 is provided between sections 74 and 75. Fluid pressure is applied to the chamber 78 between the walls 68, 69 through a passage 79 which is formed in the frame and is controlled by a valve 81. Figs. 4, 9 and 10. When the valve connects chamber 78 to a source of pressure the flexible walls 68, 69 are pressed against the side walls 71, 72 of the groove in the spindle, thus clamping the latter to the frame; and, when the valve connects the chamber to exhaust, the spindle is released.

Valve 81, Figs. 4, 9, 11 and 12, is of substantially cylindrical form and is arranged for both oscillation and reciprocation in a valve chamber formed in frame section 11 parallel to shaft 28. For oscillating the valve, the latter has on its outer end a gear 82 meshing with a pinion 83 on the oscillating and reciprocating shaft 28; and for effecting reciprocation the periphery of the gear 82 is confined between cam 34 and a flange 84 on the shaft. The valve is designed to oscillate through approximately 180°, while the drive member oscillates through the substantially greater angle a, Figs. 5 and 6; and for this reason the gear 82 is of larger tooth number than the pinion 83. As shown in plane dvelopment in Fig. 9, the valve 81 has three annular grooves, designated 85, 86 and 87, grooves 85 and 86 being connected by longitudinal grooves 88 and 89 which are diametrically opposed. Between annular grooves 85, 86 and longitudinal grooves 88, 89 are two diametrically opposed circumferential grooves 91 and 92. Passages 93 in the valve body 81 connect grooves 87, 91 and 92.

Formed in the frame section 11 are ports registering with the several grooves. One of these is port 94 which, as shown in Fig. 10, is connected by a conduit bearing the same reference number to the delivery side of a power operated constant delivery pump 95 whose intake is from a sump 96. The width of groove 85 is such that port 94 communicates with it in any position of the valve 81. Numeral 97 designates the path of the valve over the port caused by the cam 34 and the gearing 82, 83. The grooves 85, 86, 88, 89 which thus are constantly subject to pump delivery pressure are cross-hatched in Fig. 9. Another port in frame section 11, namely port 98, communicates through an exhaust conduit designated by the same reference number and which returns to the sump 96. This port opens into the groove 87 in all positions of the valve 81, the path of the valve with respect to port 98 being designated 97'. The checkered area of Fig. 9 thus represents the grooves on the valve which are constantly in communication with the exhaust passage. The passage 79 from clamp chamber 78 opens to the valve chamber through a port designated by the same reference number 79, formed in the section 11. The relative path of the port 79 with respect to the valve 81 is designated 97".

During operation of the index mechanism, when the drive member is advanced and drive pin 22 is in position 22a in Fig. 5, port 79 opens into groove 89 so that pressure is applied to chamber 78 and the spindle is thereby clamped. By the time the indexing action commences, i.e. when the drive pin has reached position 22b, Fig. 5, port 79 is at 79a, and communicates with exhaust groove 91, thereby unclamping the spindle. Immediately after the indexing action ends, i.e. as the drive pin moves beyond position 22c and approaches position 22d, the port opens to pressure grooves 88 and 86, as indicated at 79b, thereby again connecting the chamber 78 to pump pressure and causing the spindle to be clamped. This condition prevails during the entire return stroke of the drive member, as the drive pin returns to position 22a, the port being open to pressure grooves 86 and 89 throughout this return stroke, during which actual cutting of the workpiece W occurs.

Fig. 10 also illustrates schematically a hydraulic operating system of the kind disclosed in Patent No. 2,882,685, application for which was filed on even date herewith, for the motor piston 41 of the index. This system includes a pump 101 whose piston 102 is reciprocated in both directions by a rotary cam 103. The piston has valve parts 104 adapted to uncover ports 105 at the ends of the piston strokes. These ports communicate via conduit 106 with the discharge side of pump 95. In this passage is a pressure regulating valve 107 and a check valve 109. The valve 107 preferably comprises a pressure reducing valve which is set to maintain a desired pressure in the line 106 downstream therefrom. Excess fluid discharged by this valve is returned to the sump via passages 108 and 98. The pump cylinder chamber on opposite sides of piston 102 are connected by hydraulic lines 111, 112 to the motor chambers on opposite sides of piston 41. The pump 101 also has a port 113 opened by the piston 102 at the end of each stroke, the port communicating through a pressure relief valve 114 with the exhaust passages 108, 98. Similarly the motor piston 41 at the ends of its stroke opens ports 115 and 116, respectively, which communicate through a pressure relief valve 117 with the exhaust passage 98. The volumetric displacement of the pump piston 102 is slightly less than that of the motor piston 41 so that the operation is as follows:

As the rotating cam 103 moves piston 102 to the left, the port 113 is closed so that fluid displaced through line 111 to the motor causes piston 41 to move to the right. This motion is transmitted through rack and pinion 43, 44 to the drive member 22, 28, 34, operating the drive member through its work-indexing stroke. The portion of the stroke of piston 41 which is required for actual indexing, i.e. for carrying pin 22 to position 22c in Fig. 5, is concluded well before the left pump valve part 104 uncovers its port 105. After this port has been opened the stroke of piston 41 is completed by fluid flow from pump 95 and serves to carry the drive pin 22 to position 22d, Fig. 5. When this terminal position is reached the piston 41 uncovers port 115, so that flow from pump 95 continues until such time as the cam 103 effects the return stroke of piston 102, i.e. the stroke to the right. During such return stroke, fluid displaced from the pump 101 through line 112 forces the piston 41 to the left far enough to carry the pin 22 counterclockwise in Fig. 5 well beyond position 22b before right port 105 is uncovered, and the terminal portion of the stroke of piston 41, which begins with uncovering of this port and culminates in opening of port 116, is effected by pressure from pump 95.

The hydraulic system described above has the advantages of providing a closed circuit between pistons 102 and 41 during the time when actual indexing is taking place, thus assuring a positive drive at a rate which is controlled by cam 103, and of providing for exhaust flow through relief valve 117 and 114 at the end of each stroke, to keep the system free of air despite any small leakages which may occur. Furthermore the relief valve 114 maintains a pressure in the system which serves to smoothly check the terminal portion of each stroke of piston 41. Still further, upon the replacement of the hydraulic lines, including the lines 111 and 112, the system automatically refills and reestablishes the intended phase relationship between pistons 102 and 41.

Having now described the preferred embodiment of the invention, what is claimed is:

1. A machine comprising a frame, drive and driven members mounted on the frame respectively for angular oscillation and rotation about parallel axes and also for relative axial motion, the driven member having a plurality of open ended radial slots and the drive member having a pin adapted to enter said slots successively, the pin enterting and departing through the open end of each slot and its path being substantially tangent to the slot at the moments of entry and departure, means for oscillating the drive member, and means for effecting the relative axial motion in such timed relationship to the oscillation that during one oscillation the pin may enter a slot and advance the driven member and then return free of the driven member.

2. A machine according to claim 1 in which the means for oscillating the drive member is arranged to oscillate the drive member through an angle substantially greater than that in which the pin is engaged in said slots, whereby the pin is angularly displaced from the open end of the adjacent slot in each terminal position thereof.

3. A machine according to claim 1 in which the means for oscillating the drive member comprises a fluid actuated reciprocating element and a drive connection between said element and the drive member.

4. A machine according to claim 2 in which there is a rack carried by the reciprocating element and a pinion on the drive member driven by the rack.

5. A machine comprising a frame, drive and driven members mounted upon the frame for rotation about parallel axes and for relative axial motion, the driven member having a plurality of radial slots and the drive member a pin adapted to enter said slots successively, means for oscillating the drive member, means for effecting the relative axial motion in such timed relationship to the oscillation that during one oscillation the pin may enter a slot and advance the driven member and then return free of the driven member, the last mentioned means comprising a cam arranged for oscillation and having spaced forward and return paths which merge at their ends.

6. A machine according to claim 5 in which the cam is secured to the drive member and said paths thereof are spaced in the direction of the axis of the drive member, and there is a cam follower carried by the frame and against which the cam reacts, to thereby effect axial shifting of the drive member in time with its oscillation.

7. A machine according to claim 6 in which there is a switch means to compel the cam follower to follow the forward and return paths of the cam respectively during the forward and return phases of oscillation of the cam.

8. A machine according to claim 7 in which said switch means comprises a spring-backed detent on the cam follower and forward and return grooves in the cam for receiving and guiding said detent, said grooves being connected adjacent their ends and at their junctures being of different depths.

9. A machine comprising a frame, drive and driven members mounted upon the frame for rotation about parallel axes and for relative axial motion, the driven member having a plurality of radial slots and the drive member a pin adapted to enter said slots successively, means for oscillating the drive member, means for effecting the relative axial motion in such timed relationship to the oscillation that during one oscillation the pin may enter a slot and advance the driven member and then return free of the driven member, a hydraulically operated clamp for the driven member, and a valve operated by the drive member for controlling said clamp.

10. A machine comprising a frame, drive and driven members mounted upon the frame for rotation about parallel axes and for relative axial motion, the driven member having a plurality of radial slots and the drive member a pin adapted to enter said slots successively, means for oscillating the drive member, means for effecting the relative axial motion in such timed relationship to the oscillation that during one oscillation the pin may enter a slot and advance the driven member and then return free of the driven member, and the drive member being movable axially in the frame to effect said relative axial shifting of the members.

11. A machine according to claim 10 in which there is a hydraulically operated clamp for the driven member and a valve for controlling said clamp, said valve being connected to the drive member for oscillation and reciprocation thereby.

12. A machine according to claim 11 in which the valve is geared to the driven member for angular motion in time therewith and is connected to the driven member for reciprocation in unison therewith.

13. A machine according to claim 10 characterized by the driven member having a plurality of peripheral notches corresponding in number to said radial slots, a locking dog movable on the frame, means for urging the dog into engagement with said notches, a cam on the drive member, and a cam follower movable with the dog and adapted to be acted upon by the cam to lift and hold the dog disengaged from said notches during advance of the driven member, the axial shifting of the drive member positioning the cam out of engageable relation with the follower during return motion of the drive member.

14. A gear machine or the like comprising a frame, a spindle journaled for rotation on the frame, an index plate on the spindle having a plurality of circumferentially spaced radial notches, a sleeve parallel to the spindle journaled for oscillation on the frame, a shaft movable axially on the sleeve but connected thereto for oscillation in unison therewith, an axial motion cam and follower of which one is on the shaft and the other on the frame for shifting the shaft axially between an advanced position and a retracted position in time with such oscillation, first and second radial motion cams on the shaft and a third radial motion cam on the sleeve, a locking dog movable on the frame for successively engaging the notches in the index plate, said dog having a follower that is engageable by said first cam when the shaft is in advanced position for disengaging the dog from the index plate, means including a rocker on the frame and resilient means moved by the rocker for urging the dog into engagement with the index plate, and a cam follower engageable with said second and third cams for moving the rocker in a direction to engage the dog with the index plate, said second cam being engageable with the last-mentioned cam follower only when the shaft is in retracted position.

15. A machine according to claim 14 in which the followers of the radial motion cams are carried by plungers that are slidable in the frame substantially in a direction radial of the spindle and the shaft.

16. A machine according to claim 14 in which there is a fluid pressure actuated means for oscillating the sleeve.

17. A machine according to claim 14 in which the index plate has a plurality of circumferentially spaced radial slots and the shaft has a drive pin adapted to successively enter the slots of the plate for angularly advancing the plate as the shaft is oscillated, the pin being engageable with the plate when the shaft is in advanced position and clear thereof when the shaft is in retracted position.

18. A machine according to claim 14 in which said first and third cams are substantially opposed in effect, to thereby equalize the load exerted on the dog by said resilient means while the dog is being actuated by said first cam.

19. A machine according to claim 14 in which the second and third cams complement each other to retain the locking dog continuously engaged with the index plate during the return motion of the drive member.

20. A gear machine or the like comprising a frame, a spindle journaled for rotation on the frame, an index plate on the spindle having a plurality of circumferentially spaced radial slots and a corresponding number of circumferentially spaced peripheral notches, a sleeve parallel to the spindle and journaled for oscillation on the frame, a shaft movable axially in the sleeve and connected thereto for oscillation in unison therewith, an axial motion cam on the shaft and a cam follower on the frame for shifting the shaft axially between advanced and retracted positions in time with such oscillation, a drive pin carried by the shaft adapted to successively enter the slots of the plate and angularly advance the plate as the shaft is oscillated, the pin being engageable with the plate when the shaft is in advanced position and clear thereof when the shaft is in retracted position, first and second radial motion cams on the shaft and a third radial motion cam on the sleeve, a locking dog movable on the frame for successively entering the notches in the index plate, said dog having a follower that is engageable by the first cam, for releasing the lock dog from the index plate, when the shaft is in advanced position, means including a rocker on the frame and resilient means for urging the dog in a direction to engage the index plate, and a cam follower engageable with said second and third radial motion cams for moving the rocker in said direction, said second cam being engageable with the last-mentioned cam follower only when the shaft is in retracted position, the first and third cams being substantially opposed in effect to equalize the loading of said resilient means during the indexing stroke of the oscillation, and the second and third cams complementing each other to retain the dog engaged with the index plate during the return stroke of the oscillation.

21. A gear machine or the like comprising a frame, a spindle journaled for rotation in the frame, an index plate on the spindle having a plurality of notches equally spaced around the periphery thereof and having a corresponding number of equally spaced radial slots, a drive shaft journaled for rotation in the frame parallel to the spindle and having a drive pin eccentrically mounted thereon adapted to successively engage in the slots for angularly advancing the spindle, first and second radial motion cams on the shaft, a locking dog movable rectilinearly on the frame substantially radially of the spindle for successively engaging the notches in the index plate, said dog having a cam follower engageable by said first cam for lifting the dog from the index plate to enable angular advance of the spindle, means including a rocker on the frame and resilient means shifted by the rocker for urging the dog radially inwards into engagement with the index plate, and a cam follower engageable with said second cam for moving the rocker to effect such engagement of the dog at the conclusion of each angular advance of the spindle.

22. A machine comprising a frame, a spindle journaled for rotation in the frame, an index plate on the spindle having a plurality of notches equally spaced around the periphery thereof and having a corresponding number of equally spaced radial slots, a drive shaft journeled for rotation in the frame parallel to the spindle and having a drive pin eccentrically mounted thereon adapted to successively engage in the slots for angularly advancing the spindle, first and second radial motion cams on the shaft, a locking dog movable rectilinearly on the frame substantially radially of the spindle for successively engaging the notches in the index plate, said dog having a cam follower engageable by said first cam for lifting the dog from the index plate to enable angular advance of the spindle, means including a rocker on the frame and resilient means shifted by the rocker for urging the dog radially inwards into engagement with the index plate, a cam follower engageable with said second cam for moving the rocker to effect such engagement of the dog at the conclusion of each angular advance of the spindle, said cam followers being carried by plungers that are slidable in the frame in a direction substantially radial of both the spindle and the shaft, and said cams being substantially opposed in effect, whereby to equalize the radial load exerted on the dog by said resilient means while the dog is being actuated by said first cam.

References Cited in the file of this patent

UNITED STATES PATENTS

| | | |
|---|---|---|
| 646,287 | Hundhausen | Mar. 27, 1900 |
| 1,405,058 | Moore | Jan. 31, 1922 |
| 2,151,858 | Masip et al. | Mar. 28, 1939 |
| 2,757,559 | Carpenter | Aug. 7, 1956 |

FOREIGN PATENTS

| | | |
|---|---|---|
| 741,205 | Great Britain | Nov. 30, 1955 |
| 921,609 | Germany | Dec. 23, 1954 |